Jan. 1, 1957
D. W. ETTER
2,776,075
INK DISPENSER WITH COARSE AND FINE
ADJUSTMENT OF QUANTITY DISPENSED
Filed Oct. 28, 1954
2 Sheets-Sheet 1
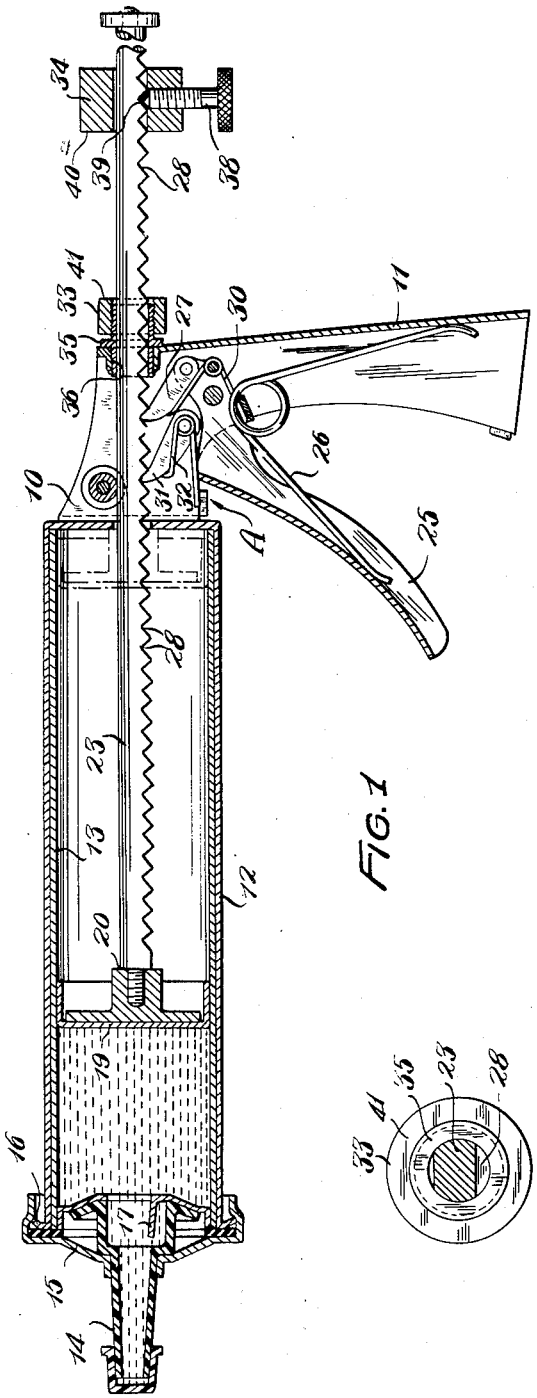
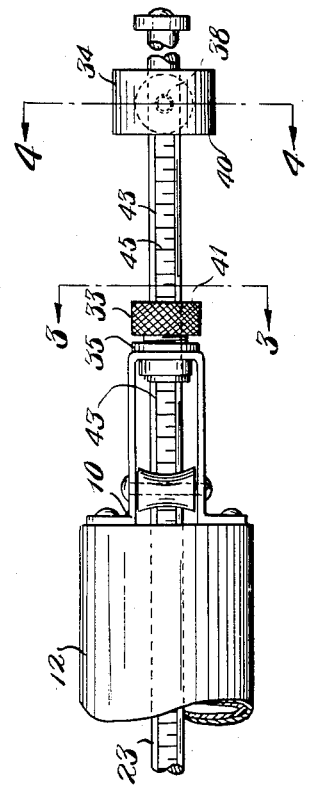
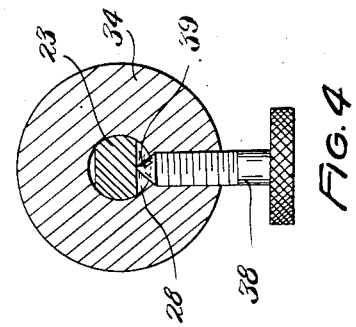
INVENTOR.
DUDLEY W. ETTER
BY Hudson, Boughton,
Williams, David & Hoffmann
ATTORNEYS Jan. 1, 1957
D. W. ETTER
2,776,075
INK DISPENSER WITH COARSE AND FINE
ADJUSTMENT OF QUANTITY DISPENSED
Filed Oct. 28, 1954
2 Sheets-Sheet 2
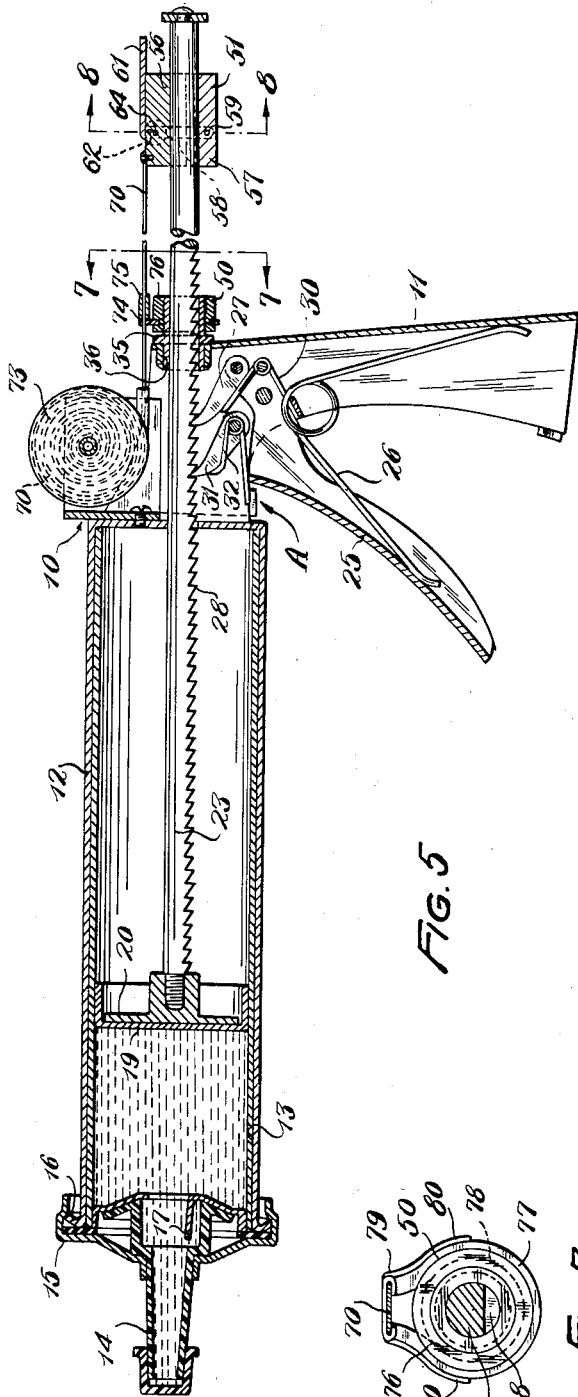
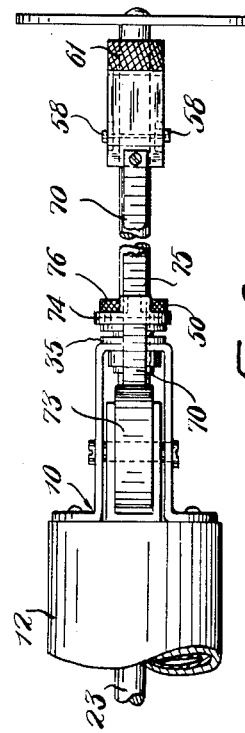
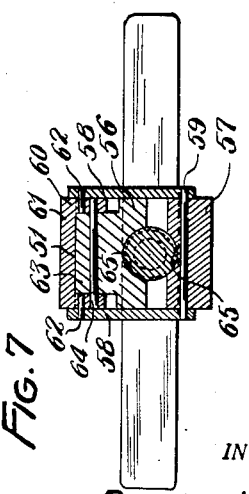
INVENTOR.
BY DUDLEY W. ETTER
ATTORNEYS

United States Patent Office 2,776,075
Patented Jan. 1, 1957

2,776,075

INK DISPENSER WITH COARSE AND FINE ADJUSTMENT OF QUANTITY DISPENSED

Dudley W. Etter, Lake Mills, Wis.

Application October 28, 1954, Serial No. 465,414

15 Claims. (Cl. 222—43)

The present invention relates to dispensing devices and, more particularly, to a portable device for containing and dispensing a desired predetermined amount of ink or the like.

The principal object of the present invention is the provision of a new and improved dispensing device comprising adjustable means including indicia which facilitates the dispensing of a desired predetermined amount or amounts of ink or the like as, for example, in a job print shop to provide an ink of a particular color by mixing two or more other colors in predetermined proportions, or to obtain a desired predetermined quantity of ink to print a particular job. The dispensing device is preferably of the type to utilize interchangeable cartridges so that it may be readily used to dispense different inks, etc.

Another object of the present invention is the provision of a new and improved dispensing device having a plunger carried by a support assembly and operable to dispense ink or other material from the assembly, indicia means, and adjustable abutment means carried by the plunger and adapted to cooperate with adjustable abutment means on the support assembly to determine the amount of material that will be dispensed upon actuation of the plunger throughout the extent of its dispensing movement, the abutment and indicia means being so constructed and arranged that the device can be accurately and quickly adjusted to dispense a desired predetermined amount of material.

Another object of the present invention is the provision of a dispensing device having an axially movable plunger for dispensing material from a tube and adjustable means for predetermining the maximum dispensing movement of the plunger, the adjustable means including indicia means so constructed and arranged that the operator may read directly the amount of material which will be dispsensed by moving the plunger from any dispensing position occupied by the plunger at the time of the reading through the remainder of its predetermined dispensing movement.

Another object of the present invention is the provision of a new and improved dispensing device having a support assembly for a tube containing material to be dispensed, a plunger, and adjustable means for predetermining the dispensing movement of the plunger and to indicate the quantity of material which will be dispensed from the tube upon completion of the predetermined dispensing movement, the adjustable means comprising first and second abutment members supported for relative movement with respect to each other, one of the abutment members being mounted on the support assembly adjacent the rod and the other being carried on the rod in such a manner that the dispensing movement of the plunger is limited by the engagement of the two abutment members, and an indicia member extending between two abutment members and having one end fixed with respect to one of the abutment members to indicate directly the amount of material which will be dispensed upon movement of the plunger from the position at the time of reading to the position where the abutment members are in engagement.

The invention resides in certain constructions and combinations and arrangements of parts, and further objects and advantages will be apparent to those skilled in the art to which it relates from the following description of a preferred embodiment described with reference to the accompanying drawings forming a part of this specification, in which:

Fig. 1 is a vertical sectional view of a device embodying the present invention and designed for the dispensing of ink;

Fig. 2 is a fragmentary plan view of the device of Fig. 1;

Fig. 3 is a sectional view taken approximately along line 3—3 of Fig. 2;

Fig. 4 is a sectional view taken approximately along line 4—4 of Fig. 2;

Fig. 5 is a vertical sectional view of a device embodying an alternate form of the present invention;

Fig. 6 is a fragmentary plan view of the device of Fig. 5;

Fig. 7 is a sectional view taken approximately along line 7—7 of Fig. 5; and

Fig. 8 is a sectional view taken approximately along line 8—8 of Fig. 5.

The present invention contemplates the provision of a portable dispensing device for inks, paints, and the like, which is so constructed and arranged that it may be quickly and easily set to dispense a predetermined amount of material upon the operation of a plunger carried on a support assembly of the device by adjusting the relative position of an abutment carried by the plunger and an abutment carried by the support assembly, the device being provided with indicia preferably reading in the units to be dispensed.

A dispensing device embodying the present invention is susceptible of use in dispensing various materials but is particularly useful in the printing field where it is necessary to accurately dispense component inks to produce an ink of a desired color. The present invention provides a dispensing device which can be easily and quickly set to accurately dispense a desired amount of ink from a tube or cartridge even though the tube or cartridge is only partly full at the beginning of the dispensing movement. The cartridge is preferably detachably connected to the dispensing device so that the same device can be used to dispense ink of various colors by merely switching cartridges.

Referring to the drawings, the dispensing device illustrated comprises a support assembly A including a support member 10 and a handle 11 of the pistol grip type formed of a channel member having its open side facing forwardly or to the left as viewed in Fig. 1. In the illustrated embodiment a tubular body member 12 is mounted on the support member 10 and is adapted to receive a cartridge 13 of ink or other material to be dispensed. It will be well understood by those skilled in the art that, if desired, the material to be dispensed could be placed directly in the tubular body member. The cartridge is provided with a discharge spout 14 and is held in place within the body member 12 by a cap 15 which cooperates with a flange 16 at the outer end of the body member. The discharge spout 14 is mounted on the top or left hand end of the cartridge 13 as it is viewed in Fig. 1, the top being provided with a frangible portion 17 which is adapted to be broken by pressure within the cartridge.

The cartridge 13 has a movable bottom 19 adapted to function as a piston in dispensing material from the cartridge 13. The bottom 19 is actuated or moved to force material from the cartridge by a plunger 20 within the tubular body member 12 which comprises a rod 23 extending rearwardly of the support member 10. Movement of the plunger 20 to the left, as viewed in Fig. 1, causes the plunger 20 to move to a dispensing position in engagement with the bottom 19 and then move the bottom so as to force ink or other material from the cartridge 13. If the material to be dispensed is placed directly in the tubular member 12, the plunger 20 may be shaped so as to also function as the piston.

An actuating mechanism is provided, in the preferred embodiment, for the plunger 20. As shown, the actuating mechanism comprises a trigger-like member 25 pivotally supported on the support member 10 forward, i. e., to the left, of the handle 11 as the device is viewed in Fig. 1. The trigger-like member 25 is biased to a forward position by a spring 26 interposed between the member 25 and the handle 11. Movement of the trigger-like member 25 against the action of spring 26 actuates a pawl 27 to advance the rod 23. The pawl 27 is pivotally supported on the upper portion of the trigger-like member 25 and has one end adapted to be received by notches 28 in the lower side of the actuating rod 23. The pawl 27 is yieldably urged into engagement with the rod 23 by means of a spring 30 intermediate the pawl 27 and the support member 10. A detent pawl 31 to hold the plunger 20 in a forward position after being advanced thereto by the pawl 27 is pivotally mounted on the support member 10 and is biased into engagement with the rod 23 by a spring 32 connected intermediate the pawl 31 and the support member 10. The detent pawl 31 is adapted to be received by the notches 28 and cooperates with the pawl 27 to advance the rod 23 in a step-by-step manner upon successive actuations of the trigger member 25 in a manner well known in the art. When it is desired to retract the plunger 20, the rod 23 may be rotated with respect to the support assembly 10 to disengage the pawls of the actuating mechanism from the notches 28, permitting the rod to be pulled rearwardly with respect to the handle to retract the plunger. It will also be well understood by those skilled in the art that other actuating mechanisms may be utilized to advance the plunger 20 or the plunger may be advanced directly by the operator without the benefit of an intermediate mechanism.

According to the present invention, suitable means comprising relatively adjustable spaced engageable abutment members 33, 34 is provided to enable the extent of the dispensing movement of the plunger 20 and, therefore, the amount of ink or other material which may be dispensed from the cartridge 13 to be predetermined. The abutment member 33 is supported coaxially with the rod 23 by a sleeve 35 onto which the member 33 is threaded. The sleeve 35 is coaxial with the rod 23 and pressed into an opening 36 in the handle 11 and is preferably welded thereto.

The abutment member 34 is, as illustrated, cylindrical and adjustable along the rod 23 which passes through the axial opening therein. The abutment member 34 may be secured at various positions along the rod 23 by means of a setscrew 38 which threads radially through the cylindrical wall of the abutment member 34. The setscrew 38 is preferably pointed at its inner end, as indicated at 39, and is adapted to cooperate with the notches 28 in the rod 23 to accurately position the abutment member so that its abutment surface 41, which is adapted to engage abutment surface 42 of the abutment member 33 to limit the dispensing movement of the plunger 20, is positioned in a particular manner with respect to indicia 43 extending lengthwise along the upper surface of the rod 23. Preferably the indicia 43 is divided directly into units of material to be dispensed so that the user may, by determining the number of unit marks intermediate the abutment surfaces 40, 41, know in advance the quantity of material which will be dispensed by moving the plunger throughout the extent of its dispensing movement, i. e., by moving abutment member 34 into engagement with abutment member 33. In the illustrated embodiment the 10-unit indicia marks 45 are positioned with respect to the notches 28 so that when the setscrew 38 is tightened to clamp the abutment member 34 in a fixed position on the rod 23, the abutment surface 40 will be aligned with a 10-unit indicia mark corresponding to the particular notch engaged by the pointed end of the setscrew 38, there being a notch for each 10-unit mark. It will be noted that the pointed end 39 of the setscrew will cooperate with sides of the notches 28 to always position the abutment member 34 in the same position with respect to the notch. After the abutment member 34 has been positioned on the rod 23 the abutment member 33 may be threaded toward or away from the abutment member 34 to set the device to dispense the exact amount desired. The range of movement of the abutment member 34 is preferably at least as great as the distance between the bottoms of the notches 28. By constructing the abutment member 34 and its support in such a manner that the abutment surface 40 is always aligned with a particular indicia unit mark, the operator has only one movable abutment member, i. e., member 33, to accurately position by sight even though two movable abutment members are utilized.

It is oftentimes desirable that the person dispensing the ink or other material from the dispensing device be able to glance at the indicia means for indicating the amount of material which will be dispensed and read directly the quantity that the device is set to dispense. The dispensing device illustrated in Figs. 5 through 8 is provided with indicia means which will always directly indicate the quantity of material which will be dispensed upon movement of the plunger from the position occupied at the time of the reading throughout the extent of its predetermined movement. The structure of the dispensing device of Fig. 5 is generally the same as the first described embodiment with the exception of the abutment means for determining the movement of the plunger and the indicia means, and will not, therefore, be described again. The parts, however, of the device of Fig. 5 have been designated by the same reference numerals as the corresponding parts of the first described embodiment.

In the dispensing device illustrated in Figs. 5 through 8, the extent of the movement of the plunger 20 in its dispensing direction is determined by spaced abutment members 50, 51 mounted on the support member 10 and the rod 23, respectively, and which are adapted to cooperate in the same manner as the abutment members 33, 34 of the first described embodiment. The abutment member 51 is adjustably mounted on the rod 23 and comprises an upper clamp member 56 and a lower clamp member 57 connected together by links 58, the rod 23 passing intermediate the clamp members 56, 57. The lower ends of links 58 are pivotally connected to the lower clamp member 57 by a pin 59 which passes through the links 58 and the lower clamp member. The upper ends of the links 58 are pivotally connected to the legs of a U-shaped portion 60 of a lever 61 by pins 62. The U-shaped portion 60 encompasses a reduced portion 63 of the upper clamp member 56 and is pivotally secured thereto by a transverse pin 64 which passes through the legs of the U-shaped portion 60 and the reduced portion 63. The pin 64 is located intermediate the pins 62 for the links 58 and the outer ends of the legs of the U-shaped portion 60 so that if the lever 61 is pivoted about the axis of the pin 64 from the position shown in Fig. 4, the spacing between the upper and lower clamp member 56, 57 will be increased to release the clamping action of the members. When it is desired to secure the abutment member 51 in a particular position on the rod, the lever 61 is again moved to the position shown in Fig. 5. The adjacent sides of the upper and lower clamp members 56, 57 are recessed as indicated at 65 to conform to the configuration of the rod.

The abutment member 50 is similar to the abutment member 33 and comprises a nut which is threaded onto the sleeve 35 so that it may be moved toward and away from the abutment member 51.

To enable the operator to quickly and accurately set the dispensing device to dispense a predetermined amount of ink or other material and also be able to read directly the amount of material which will be dispensed if the plunger 20 is moved from its immediate dispensing position through the remainder of its dispensing movement, an indicia member 70 is supported between the abutment member 51 and the abutment member 50 so as to indicate the distance between the abutment members 50, 51 and to, therefore, indicate the amount of material which will be dispensed if the plunger 20 is moved to a position where the abutment 51 is in engagement with the abutment 50. It is desirable that the indicia member be calibrated directly in units of material dispensed.

In the embodiment of Fig. 5, the indicia member 70 has one end connected to the abutment member 51 with the unused portion of the member 70 wound on a reel within a reel housing 73 mounted upon the support member 10. The indicia member 70 extends from the reel housing 73 through an indicator member 74 supported on the abutment member 50 for movement therewith but in a manner which permits relative rotation between the abutment member 50 and the indicator member 74. The indicator member 74 has an indicating edge 75 immediately above and in the plane of the abutment surface 76 of the member 50 so that the edge 75 may be used to read the distance between the abutment members 50, 51.

The indicator member 74 is shown as comprising a ring-like portion 77 which encircles the abutment member 50 and is received in an annular groove 78 therein. The indicating edge 75 is a part of a member 79 having spaced legs 80 which straddle the ring-like portion 77 and are secured thereto by any suitable means such as solder.

The indicia member 70 is provided with indicia as illustrated in Fig. 2. The zero marking of the indicia coincides with the abutment surface 81 of the abutment member 51 and therefore the reading at the indicating edge 75 will tell the operator the number of units which will be dispensed if he moves the plunger 20 through its predetermined maximum movement from the position where the reading is taken. The means for supporting the abutment member 50 comprising the threaded sleeve 35, constitutes a fine adjustment and facilitates the setting of the dispensing device to dispense a predetermined amount. The abutment member 51 may be moved along the rod until the desired indicia approximately coincides with the indicating edge 75 and the abutment member 50 then adjusted to move the indicating edge exactly on the desired indicia.

If the cartridge is full at the time it is positioned in the dispensing device of either embodiment, the plunger 20 will begin its dispensing stroke in its fully retracted position. If, however, the cartridge is only partly full when it is inserted into the dispensing device, the movable bottom 19 of the cartridge will be in a position intermediate the top and bottom ends of the cartridge and the plunger 20 will have to be moved to a dispensing position against the bottom prior to the setting of the movable abutment member on the rod 23. The distance between the abutments will then determine the dispensing movement of the plunger and the quantity of material dispensed.

It can now be seen that the present invention provides a dispensing device having adjustable means to determine and indicate the amount of ink, paint or other material which will be dispensed upon operation of the device, the means being so constructed and arranged that the operator can read from indicia the amount of material which will be dispensed upon the movement of the actuating rod 23 from any dispensing position through its dispensing movement and can readily and accurately preset the dispensing device to dispense a desired measured quantity of material regardless of the quantity of material contained in the dispensing device and the initial position of the dispensing member.

It is to be understood that the invention is not limited to the constructions shown and described in detail, and it is my intention to cover hereby all adaptations, modifications and changes therein which come within the practice of those skilled in the art to which the invention relates and the scope of the appended claims.

Having thus described my invention, what I claim is:

1. A device for dispensing a measured quantity of material, a support assembly for receiving material to be dispensed, an axially movable plunger comprising a rod operable in one direction to dispense material, first and second abutment members, said first abutment member being supported on said rod for movement in either direction along said rod and including means operable to secure said first abutment member against movement along said rod, and means for threadably mounting said second abutment member on said support assembly adjacent said rod inwardly of said first abutment member in said one direction for movement toward and away from said first abutment member, said device having indicia means extending between said abutment members.

2. In a device for dispensing a predetermined quantity of material, a support assembly adapted to receive material to be dispensed, a plunger assembly comprising a rod axially movable in one direction to dispense material, a first abutment member carried by said rod, a second abutment member on said support assembly adjacent said rod and engageable with the first abutment member to determine and limit the movement of said rod in said one direction, the relative positions of said abutment members being adjustable, and a reel housing on said support assembly having an indicia member therein, said indicia member extending from said reel housing and between said abutment members and having one end connected to one of said abutment members.

3. In a device for dispensing a predetermined quantity of material, a support assembly adapted to receive material to be dispensed, a plunger on said support assembly comprising an axially movable rod operable in one direction to dispense material from the device, first and second abutment means, said first abutment means being carried by said rod and adjustable therealong in either direction and comprising first and second clamp members operable to clamp said first abutment means in a fixed position on said rod, means for mounting said second abutment means on said support assembly adjacent said rod in a position engageable with said first abutment means for limiting the movement of said rod in said one direction and including fine adjusting means for supporting said second abutment means for movement toward and away from said first abutment means, and indicia means extending between said first and second abutment means.

4. In a device for dispensing a predetermined quantity of material, a support assembly adapted to receive material to be dispensed, a plunger on said assembly comprising an axially movable rod operable in one direction to dispense material from the device, first abutment means movably supported on said rod, second abutment means on said support assembly adjacent said rod and engageable with said first abutment means to limit the movement of said rod in said one direction, said first abutment means comprising relatively movable clamp members on opposite sides of said rod actuatable to a clamping position to secure said first abutment means in a desired position on said rod, means threadingly mounting said second abutment means on said support assembly coaxially with said rod for movement toward and away from said first abutment means, and an indicia member extending between said abutment means.

5. In a device for dispensing a predetermined quantity of material, a support assembly adapted to receive material to be dispensed, a plunger comprising a rod axially movable in one direction for dispensing material from the device, first and second abutment members, means for supporting said first abutment member on said rod for movement in either direction along said rod, means for mounting said second abutment member on said support assembly adjacent said rod inwardly of said first abutment member to limit the movement of said rod in said one direction and including fine adjusting means for moving said second abutment member toward and away from said first abutment member, and a reel housing supported on said support assembly having an indicia member therein, said indicia member extending from said housing and between said abutment members.

6. A dispensing device for dispensing material from a tube comprising a support assembly including a handle, a plunger comprising an axially movable rod mounted on said support and operable in one direction to force material from a tube on said support assembly, a mechanism carried by said support asseembly operatively connected to said rod and operable for advancing said plunger through its dispensing movement, a first abutment member carried by said rod and adjustable therealong, said first abutment member including means operable to secure the member against movement along said rod, a second abutment member, and means mounting said second abutment member on said support assembly adjacent said rod inwardly of said first abutment member for engagement therewith to limit the movement of said rod in said one direction and for fine adjustment toward and away from said first abutment members, said device including indicia means extending between said abutment members.

7. A device for dispensing a predetermined quantity of material comprising a support assembly adapted to receive material to be dispensed and including a handle, a plunger carried by said support assembly comprising a rod axially movable in one direction to dispense material from the device, a mechanism on said support assembly operatively connected to said rod and operable for advancing said rod in said one direction, a first abutment means carried by said rod, a second abutment means on said support assembly adjacent said rod and engageable with the first abutment means to determine and limit the movement of said rod in said one direction, the relaitve positions of said first and second abutment means being adjustable, and a reel housing on said support assembly having an indicia member therein, said indicia member extending from said reel housing and between said first and second abutment means.

8. A device for dispensing a measured quantity of material comprising a support assembly including a handle, a plunger comprising a rod axially movable on said support assembly and operable in one direction to force material from a tube on said support assembly, a manually operated step-by-step mechanism on said support assembly operatively connected to said rod and operable to advance said rod in said one direction, first abutment means movably supported on said rod and second abutment means on said support assembly adjacent to said rod, said first abutment means comprising means operable to secure said first abutment means in a desired position on said rod, and means mounting said second abutment means on said support assembly for adjustment toward and away from said first abutment means, said device having indicia means extending between said first and second abutment means.

9. A dispensing device for dispensing a predetermined quantity of material comprising a support assembly adapted to receive material to be dispensed and including a handle, a plunger comprising an axially movable rod mounted on said support assembly and operable in one direction to dispense material from a container on said support assembly, a mechanism on said support assembly operatively connected to said rod and operable for advancing said rod in said one direction, first and second abutment members, means for supporting said first abutment member on said rod for movement in either direction along said rod, means for mounting said second abutment member on said support assembly adjacent said rod inwardly of said first abutment member to limit movement of said rod in said one direction and including fine adjusting means for moving said second abutment member toward and away from said first abutment member, and a reel housing supported on said support assembly and having an indicia member therein, said indicia member extending from said housing and between said abutment members.

10. A device for dispensing a predetermined quantity of material, comprising a support assembly including a handle, a plunger comprising an axially movable rod mounted on said support assembly and operable in one direction to force material from a container on said support assembly, a step mechanism on said support assembly operatively connected to said rod for advancing said rod in said one direction, a trigger-like member pivoted to said support assembly adjacent said handle and operatively connected to said step mechanism for operating the latter, a first abutment means comprising first and second clamp members on opposite sides of said rod, said clamp members being operable to permit said first abutment means to be adjusted along said rod, second abutment means inwardly of said first abutment means and engageable therewith to limit movement of said rod in said one direction comprising a nut coaxial with said rod and threadingly mounted on said support assembly for movement toward and away from said first abutment means, a reel housing on said support assembly having an indicia member therein, said indicia member extending from said housing and between said first and second abutment means with the outer end thereof being connected to said first abutment means for movement therewith, and an indicating member supported by said nut adjacent said indicia member, said indicating member and said nut being capable of relative rotational movement.

11. A dispensing device for dispensing a predetermined quantity of material comprising a support assembly adapted to receive material to be dispensed and including a handle, a plunger carried by said support assembly comprising a rod axially movable in one direction to dispense material from the device, said rod having notches along one side thereof and indicia means along another side thereof, the bottoms of said notches being positioned in a predetermined manner with respect to certain unit marks of said indicia means, a mechanism on said support assembly having means adapted to cooperate with said notches for advancing said rod in said one direction, a first abutment means carried by said rod, a second abutment means on said support assembly adjacent said rod and engageable with the first abutment means to determine and limit the movement of said rod in said one direction, said first abutment means including means adapted to cooperate with said notches to secure said first abutment means in a predetermined position with the abutment surface thereof aligned with one of said unit marks.

12. A device for dispensing a measured quantity of material comprising a support assembly adapted to receive material to be dispensed, a plunger on said support assembly comprising an axially movable rod operable in one direction to dispense material from the device, first and second abutment members each having a portion providing an abutment surface, said first abutment member being carried by said rod and adjustable therealong in either direction and comprising means operable to secure said first abutment member in a fixed position on said rod, and means mounting said second abutment member on said support assembly adjacent to said rod with the abutment surface thereof in position to be engaged by the abutment surface of said first abutment member to limit the movement of said rod in said one direction, one of said abutment members including fine adjustment means for supporting the portion thereof carrying the abutment surface for movement toward and away from the other abutment member, said device having indicia means extending between said first and second abutment members.

13. A device for dispensing a measured quantity of material comprising a support assembly adapted to receive material to be dispensed, a plunger on said support assembly comprising an axially movable rod operable in one direction to dispense material from the device, mechanism carried by said support assembly and operatively connected to said plunger for advancing said plunger in said one direction in a step-by-step manner, first and second abutment members each having a portion providing an abutment surface, said first abutment member being carried by said rod and adjustable therealong in either direction and comprising means operable to secure said first abutment member in a fixed position on said rod, means mounting said second abutment member on said support assembly adjacent to said rod with the abutment surface thereof in position to be engaged by the abutment surface of said first abutment member to limit the movement of said rod in said one direction, one of said abutment members including fine adjustment means for supporting the portion thereof carrying the abutment surface for movement toward and away from the other abutment member, said device having indicia means extending between said first and second abutment members.

14. A device for dispensing a measured quantity of material comprising a support assembly adapted to receive material to be dispensed, a plunger on said support assembly comprising an axially movable rod operable in one direction to dispense material from the device, first and second abutment members each having a portion providing an abutment surface, said first abutment member being carried by said rod and adjustable therealong in either direction and comprising means operable to secure said first abutment member in a fixed position on said rod, means mounting said second abutment member on said support assembly adjacent to said rod with the abutment surface thereof in position to be engaged by the abutment surface of said first abutment member to limit the movement of said rod in said one direction, one of said abutment members including fine adjustment means for supporting the portion thereof carrying the abutment surface for movement toward and away from the other abutment member, said device having indicia means extending between said first and second abutment members and said rod having a plurality of equidistantly spaced recesses along a side thereof and indicia means extending along a side thereof, each of said recesses being positioned in a predetermined manner with respect to a corresponding unit mark of said indicia means, and said first abutment member including means adapted to cooperate with said recess to secure said first abutment means in positions along said rod with the abutment surface thereof positioned in a predetermined manner with respect to the unit marks of said indicia means.

15. A dispensing device for dispensing a measured quantity of material comprising a support assembly adapted to receive material to be dispensed and including a handle, a plunger carried by said support assembly comprising a rod axially movable in one direction to dispense material from the device, means carried by said support assembly and operatively connected to said rod for advancing the rod in a step-by-step manner in said one direction, a first abutment means carried by said rod and adjustable therealong, a second abutment means on said support assembly adjacent to said rod and engageable with said first abutment means to determine and limit the movement of said rod in said one direction, said rod having a plurality of equidistantly spaced recesses along a side thereof and indicia means extending along a side thereof, said recesses being positioned in a predetermined manner with respect to the unit marks of said indicia means, and said first abutment means including means adapted to cooperate with said recesses to secure said first abutment means in positions on said rod with the abutment surface thereof positioned in a predetermined manner with respect to the unit marks of said indicia means.

References Cited in the file of this patent
UNITED STATES PATENTS

| | | |
|---|---|---|
| 206,211 | Austin | July 23, 1878 |
| 874,574 | Davis | Dec. 24, 1907 |
| 1,229,146 | Shields | Dec. 24, 1907 |
| 1,777,293 | Curtis et al. | Oct. 7, 1930 |

FOREIGN PATENTS

| | | |
|---|---|---|
| 224,355 | Great Britain | Nov. 13, 1924 |